(12) United States Patent
Nam et al.

(10) Patent No.: US 7,363,153 B2
(45) Date of Patent: Apr. 22, 2008

(54) RE-ROUTING APPARATUS AND METHOD FOR CALCULATING AN OPTIMUM ALTERNATIVE PATH TO AN ORIGINAL PATH FROM A POSITION DEVIATED FROM THE ORIGINAL PATH IN A NAVIGATION SYSTEM AND A NAVIGATION SYSTEM USING THE SAME

(75) Inventors: Joo-Hyun Nam, Seoul (KR); Ji-Youn Jeon, Seoul (KR); Yong-Ik Choi, Suwon-shi (KR); Hae-Don Chon, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 591 days.

(21) Appl. No.: 10/640,791

(22) Filed: Aug. 13, 2003

(65) Prior Publication Data
US 2004/0215392 A1    Oct. 28, 2004

(30) Foreign Application Priority Data
Apr. 24, 2003    (KR)    ............ 10-2003-0025939

(51) Int. Cl.
G01C 21/00    (2006.01)
(52) U.S. Cl. .................. 701/210; 340/990
(58) Field of Classification Search .......... 701/200, 701/201, 202, 207, 208, 209, 210, 211; 340/990, 340/988, 995
See application file for complete search history.

(56) References Cited

U.S. PATENT DOCUMENTS

| | | | | |
|---|---|---|---|---|
| 6,038,509 | A * | 3/2000 | Poppen et al. ............ | 701/210 |
| 6,125,323 | A * | 9/2000 | Nimura et al. ............ | 701/207 |
| 6,256,579 | B1 * | 7/2001 | Tanimoto .................. | 701/201 |
| 6,418,373 | B1 * | 7/2002 | Omi et al. ................. | 701/209 |
| 6,909,965 | B1 * | 6/2005 | Beesley et al. ........... | 701/209 |
| 6,947,837 | B2 * | 9/2005 | Fukushima et al. ....... | 701/209 |
| 6,950,746 | B2 * | 9/2005 | Yano et al. ............... | 701/210 |
| 2003/0158653 | A1 * | 8/2003 | Sakai ...................... | 701/205 |

FOREIGN PATENT DOCUMENTS

| | | |
|---|---|---|
| EP | 0 805 336 | 11/1997 |
| JP | 1173298 | 7/1989 |
| JP | 1173299 | 7/1989 |
| JP | 5045170 | 2/1993 |

\* cited by examiner

Primary Examiner—Delena Tran
(74) Attorney, Agent, or Firm—The Farrell Law Firm, PC (57) ABSTRACT

A re-routing apparatus and method for calculating an optimum path from a path deviated position to an original path in a navigation system, and a navigation system using this apparatus and method are disclosed. When a movable body traveling on a predetermined path provided from a navigation system has deviated from the path, links are selected which meet links extending in a direction having small accumulated travel cost from the deviated position link from among links included in the original path, and then paths traveling from the deviated position to the destination via the selected links are determined as re-routing paths. Accordingly, when the movable body has deviated from the predetermined path communication cost to connect with a server can be reduced and another deviation possibility due to time delay taken until new paths are provided can also be reduced by enabling the navigation terminal by itself to calculate the optimum path from the deviated position to the original path without connecting with the server.

29 Claims, 7 Drawing Sheets

RE-ROUTING APPARATUS AND METHOD FOR CALCULATING AN OPTIMUM ALTERNATIVE PATH TO AN ORIGINAL PATH FROM A POSITION DEVIATED FROM THE ORIGINAL PATH IN A NAVIGATION SYSTEM AND A NAVIGATION SYSTEM USING THE SAME

PRIORITY

This application claims priority to an application entitled "A Re-Routing Apparatus And Method For Calculating An Optimum Path To An Original Path From Position Detached Oneself From The Original Path In A Navigation System And A Navigation System Using This Apparatus And Method" filed in the Korean Industrial Property Office on Apr. 24, 2003 and assigned Serial No. 2003-25939, the contents of which are hereby incorporated by reference.

BACKGROUND OF THE INVENTION

1. Field of the Invention

The present invention relates to a navigation system, and more particularly, to a re-routing apparatus and method for calculating an optimum alternative path to an original path from a position deviated from the original path and then performing a re-routing for a path to a destination according to the calculated result when a movable body receiving path guidance through a navigation system has deviated from the original path.

2. Description of the Related Art

In general, movable bodies such as ships, airplanes and cars, may be provided with navigation systems. A navigation system receives radio signals, representing coordinates, e.g., latitude, a longitude, an altitude, etc., from a plurality of satellites included in the Global Positioning System (GPS), and calculates a current position of a movable body. Further, such a navigation system displays geographical information including the current position of the movable body according to map data stored in advance. That is, such a general navigation system provides drivers with various information necessary for driving, by means of information received from the GPS. For example, it displays on a screen a current speed of movement, a path of movement, set by a driver before driving, and an optimum path to a destination.

Figure 1:
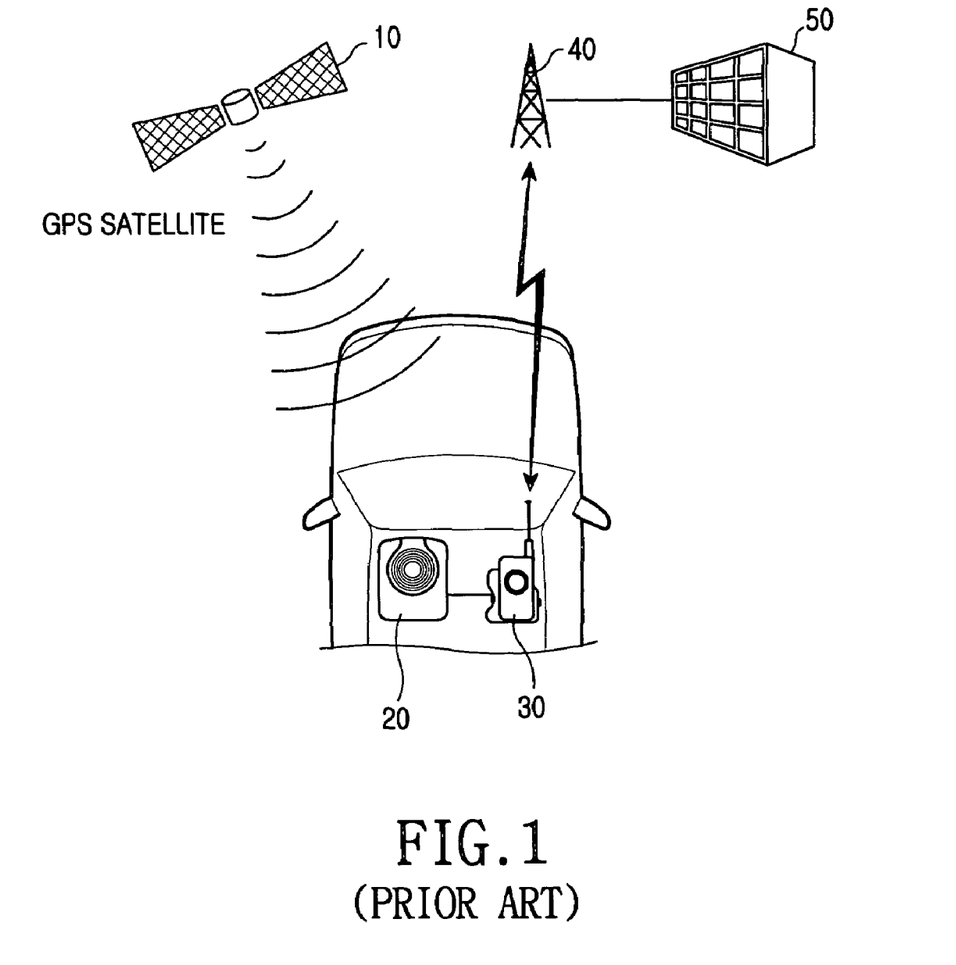
FIG. 1 is a diagram showing a construction of a conventional navigation system.

FIG. 1 is a diagram showing the make-up of a conventional navigation system. Such navigation system includes a GPS satellite 10, a mobile terminal 30, for instance, cell phone, communicating with a wireless network 40 and a navigation terminal 20, for instance, a navigation kit, communicating with the GPS satellite 10 and the mobile terminal 30 in order to provide a driver with current position information and travel information of a movable body. In the exemplary navigation system the navigation terminal 20 and the mobile terminal 30 are provided in a car.

The navigation terminal 20 receives the position information of the movable body from the GPS satellite 10 and analyzes the position of the movable body. Further, the navigation terminal 20 transmits the position information to the mobile terminal 30 in order to provide the driver with the travel information of the corresponding position.

The mobile terminal 30 functions as an interface between the navigation system and driver. For instance, when the driver requests current position information of the movable object and a path to a destination by means of the mobile terminal 30, the navigation system provides corresponding information to the driver through a display unit (not shown) of the mobile terminal 30. Generally, the information thus provided through the display unit of the mobile terminal 30 is image information, and sound information is provided to the driver through a speaker installed on the navigation terminal 20.

For this, the mobile terminal 30 performs data transmission/reception with an information server 50 such as a traffic server, which is connected through the wireless network 40.

In general, the information server 50 constructs the travel information in a predetermined data format such as Route Guidance Information (RGI) data, and transmits the constructed data format to the navigation terminal 20 via the mobile terminal 30. The navigation terminal 20 analyzes the data format and provides the driver with the travel information of a corresponding position. In this case, the RGI data is the travel information of a link unit.

Figure 2:
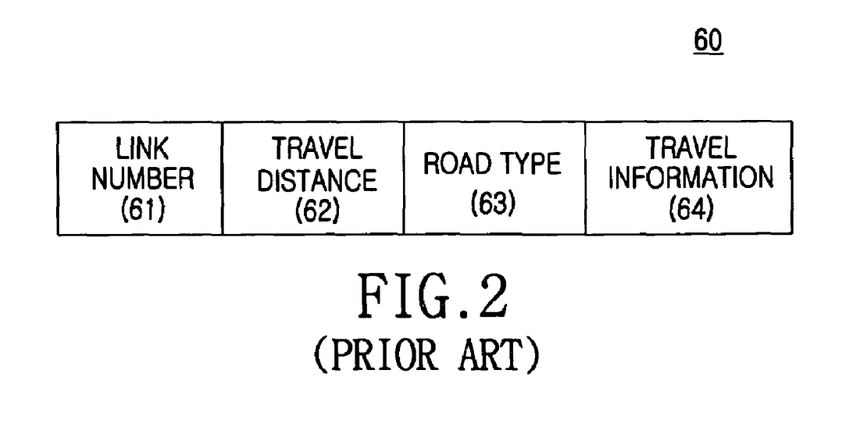
FIG. 2 is a diagram of a data format of RGI data 60 utilized conventionally in a navigation system.

FIG. 2 illustrates a data format of RGI data 60 utilized conventionally in a navigation system. The RGI data 60 includes a link number field 61, a travel distance field 62, a road type field 63 and a travel information field 64. Each field stores the following information. The link number field 61 stores an identification number regarding the link, the travel distance field 62 stores an entire travel distance of a corresponding link, the road type field 63 stores road types of the corresponding link such as a local highway, a national highway or an express highway. Further, the travel information field 64 stores travel information regarding what is in front of a movable body, such as a left turn 200 m in front and a sharp curve 300 m in front. The RGI data 60 may further include a field for storing additional service information regarding a corresponding path.

Figure 3:
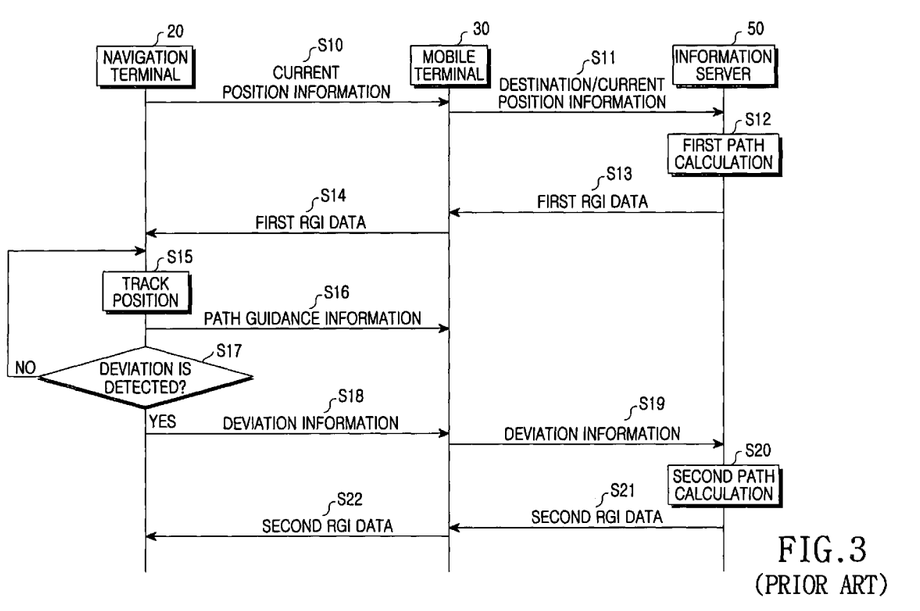
FIG. 3 is a flow chart of a path guidance method according to a conventional embodiment.

FIG. 3 is a flow chart of a path guidance method according to a conventional embodiment. First, if a user inputs a destination to the mobile terminal 30 in order to obtain optimum path information for a predetermined destination, the mobile terminal 30 transmits, in step S10, current position information sent from the navigation terminal 20 and, in step S11, the destination information, to the information server 50 via the wireless network. In the present case, the navigation terminal 20 detects the current position information of the movable object by means of a GPS receiver and transmits the detected result to the mobile terminal 30. The information server 50 calculates in step S12 an optimum path to a corresponding destination by using real-time traffic information stored in advance, and transmits first RGI data, which has been generated by the result from the calculation, to the navigation terminal 20 via the mobile terminal 30 in steps S13, and S14 respectively. In the present example, the information server 50 receives the real-time traffic information from an outside server such as the traffic server, or manages the information after collecting the information itself.

Further, in step S15 the navigation terminal 20 tracks a current position of a movable body by comparing the first RGI data with sensor data collected by itself, and in step S116 transmits path guidance information according to the result from the tracking, to the mobile terminal 30. Further, on the basis of the result from the tracking, the navigation terminal 20 judges whether the movable body has deviated from a path transmitted from the information server 50 or not. When a deviation is detected in step S17, the navigation terminal 20 transmits the deviation information such as a deviated position information to the mobile terminal 30 in step S18.

The mobile terminal 30, which has received the deviation information, transmits the deviation information to the information server 50 after connecting to the information server 50 via the wireless network, in order to obtain an optimum path from the position deviated from the original path, hereinafter, referred to 'deviated position' to a destination and provide the obtained optimum path to the navigation terminal 20 in step S19.

In step S20 the information server 50 recalculates the optimum path to the destination from the deviated position by means of the deviation information and the already stored destination information and transmits second RGI data, which has been generated as a result of the calculation, to the navigation terminal 20 via the mobile terminal 30 in steps S21 and S22 respectively. That is, in the prior art, when the movable body has deviated from an initial path transmitted from the information server 50, the navigation terminal 20 must receive the optimum path from the deviated position to the destination again, only after reconnection to the information server 50 via the mobile terminal 30.

Accordingly, in the prior art, there is a problem in that the navigation system user must defray a communication cost for reconnection to the information server 50. Further, in the conventional navigation system, it takes too much time for a user to reconnect to the information server 50 and receive a new path, thereby increasing inconvenience to the user. Moreover, since the movable body goes on moving until it receives the new path, there is a high possibility that another deviation from the new received path may occur.

SUMMARY OF THE INVENTION

Accordingly, the present invention solves the above-mentioned problems occurring in the prior art, and it is a first object of the present invention to provide a re-routing method and apparatus for calculating an optimum path from a deviated position to an original path, and for performing a re-routing for a path to a destination according to the calculated result, when a movable body has deviated from a predetermined path.

It is a second object of the present invention to provide a re-routing method and apparatus for enabling a navigation terminal by itself to calculate an optimum path from a deviated position to an original path, and for performing a re-routing for a path to a destination according to the calculated result, without connecting with servers through a communication network.

It is a third object of the present invention to provide a re-routing method and apparatus for calculating an optimum path from a deviated position to an original path by means of map information already stored in a navigation terminal, and for performing a re-routing for a path to a destination according to the calculated result.

It is a fourth object of the present invention to provide a re-routing method and apparatus for calculating an optimum path from a deviated position to an original path of a destination direction, and for performing a re-routing for a path to a destination according to the calculated result.

It is a fifth object of the present invention to provide a navigation system including a re-routing apparatus, which provides optimum path information to a original path calculated by a re-routing apparatus to a movable body having deviated from a path.

In order to accomplish these objects, according to a preferred embodiment of the present invention, there is provided a re-routing apparatus comprising: a deviation information input section for receiving a deviated position link information, when a movable body traveling on a predetermined path provided from the navigation system has deviated from the path; an adjacent link detecting section for detecting link information detected from map data in a process of calculating an optimum path from the deviated position to the original path, when the movable body has deviated from the path; a second table for temporarily storing the detected link information detected by the adjacent link detecting section; a path selecting section for analyzing the link information stored in the second table and calculating an optimum path from the deviated position link to any one link from among links included in the original path; a first table for storing the link information selected as reserved links, which will be included in the optimum path, from the second table in a process that the path selecting section calculates the optimum path; and a re-routing information extracting section for extracting links included in the optimum path from among the links stored in the first table and extracting re-routing paths including the extracted links, according to control of the path selecting section.

In order to further accomplish these objects, according to a preferred embodiment of the present invention, there is provided a re-routing method comprising the steps of: (1) when a movable body traveling on a predetermined path provided from the navigation system has deviated from the path, extracting a deviated position link information from map data; and (2) selecting links meeting links extending in a direction having small accumulated travel cost from the deviated position link from among links included in the original path, and determining which paths are re-routing paths, wherein the re-routing paths are paths traveling from the deviated position to the destination via the selected links. In this case, it is preferred that in step 2, a first one of links meeting a link extending in a direction having a small accumulated travel cost from a deviated position is determined as the re-routing path, or information about a predetermined number of links meeting the link extending in the direction having a small accumulated travel cost from the deviated position link is compared with each other, so as to select a link having a minimum sum of a first cost necessary for traveling from the deviated position to corresponding link and a second cost necessary for traveling from the link to destination, and then a path from the deviated position through the selected link to the destination is determined as the re-routing path.

Also, in order to accomplish these objects, according to a preferred embodiment of the present invention, there is provided a navigation system further comprising a re-routing apparatus, wherein the re-routing apparatus calculates an optimum path from a deviated position to an original path, when a movable body traveling on a predetermined path provided from a navigation system has deviated from the path.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

Figure 4:
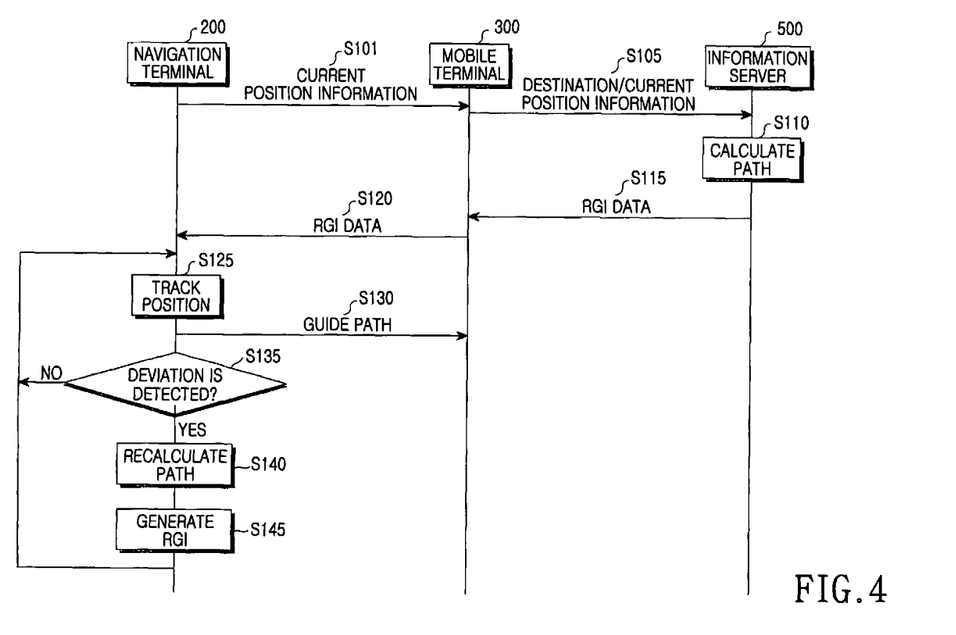
FIG. 4 is a flow chart of a path guidance method according to an embodiment of the present invention.

FIG. 4 is a flow chart of a path guidance method according to an embodiment of the present invention. First, if a user inputs a destination to the mobile terminal 300 in order to obtain optimum path information to a predetermined destination, the mobile terminal 300 transmits current position information sent from the navigation terminal 200 and the destination information to the information server 500 via the wireless network in steps S101 and S105 respectively. In this case, the navigation terminal 200 detects the current position information by means of a GPS receiver and transmits the detected result to the mobile terminal 300. The information server 500 calculates an optimum path to a corresponding destination by using real-time traffic information stored in advance in step S110, and transmits RGI data, which has been generated by the result from the calculation, to the navigation terminal 200 via the mobile terminal 300 in steps S115 and S120 respectively. In this case, the information server 500 receives the real-time traffic information from an outside server such as the traffic server, or manages the information after collecting the information by itself.

In step S125, the navigation terminal 200 tracks a current position of the movable body by means of the first RGI data, sensor data collected by itself, and stored map data. Further, the navigation terminal 200 transmits path guidance information according to the result obtained by tracking to the mobile terminal 300 in step S130. According to the result obtained by tracking in step S125, it is judged in step S135 whether a movable body has deviated from a path transmitted from the information server 500 or not. Herein, since a method, for judging whether the movable body has deviated from the path or not departs from the subject matter of the present invention, a detailed description for such a path deviation judgment method is omitted.

From the result of the judgment in step S135, when it is judged that the movable body has deviated from the path, the navigation terminal 200 in step S140 recalculates a path by itself by means of deviation information such as deviated position link information. That is, the navigation terminal 200 calculates an optimum path from the position deviated from the original path, hereinafter, referred to 'deviated position' to a predetermined path included in the optimum path received from the information server 500 by means of the map data already stored in the navigation terminal 200.

In step 145, the navigation terminal 200 generates RGI data according to the result of step S140 of the calculation, and then guides the movable body through a path of step S130, while tracking the position of the movable body in step S125. Further, the navigation terminal 200 repeatedly carries out a series of steps S125 to S145 of detecting, in step S135, if there exists a deviation of the movable body from the original path or not.

Thus, according to the present invention, the navigation terminal 200 does not have to reconnect with the information server 500 in order to provide re-routing information to a movable body, which has deviated from a path.

Figure 5:
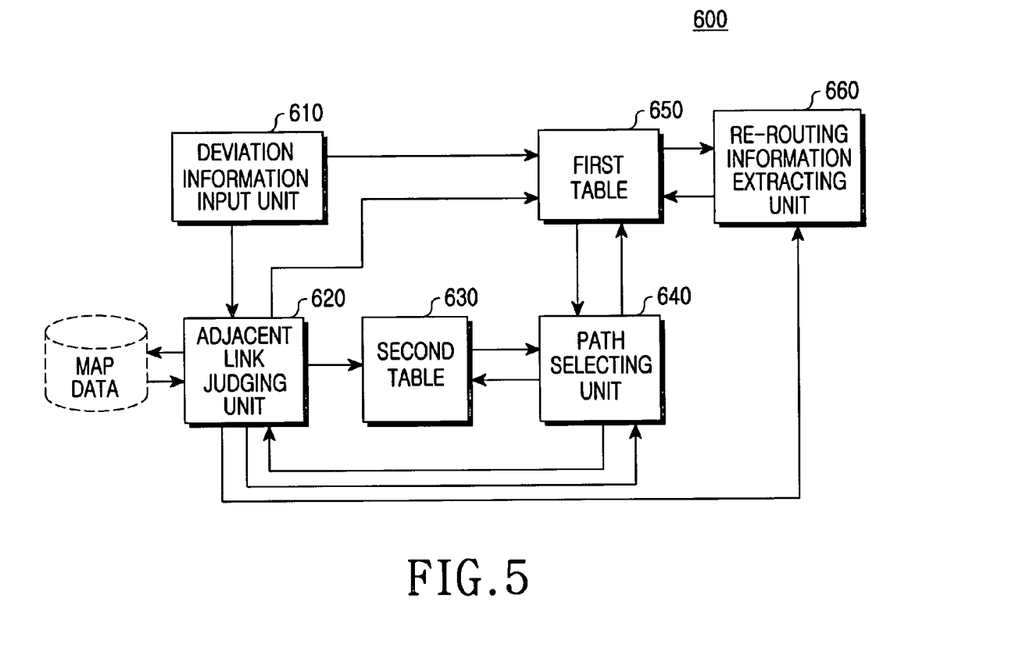
FIG. 5 is a block diagram showing a schematic construction of a re-routing apparatus according to an embodiment of the present invention.

FIG. 5 is a block diagram showing a schematic construction of a re-routing apparatus according to an embodiment of the present invention. The re-routing apparatus 600 includes a deviation information input section 610, an adjacent link detecting and judging section 620, a second table 630, a path selecting section 640, a first table 650, a re-routing information extraction section 660.

When a traveling movable body has deviated from a predetermined path having been provided by an information server, the deviation information input section 610 receives deviation information such as deviated position link information, and then stores the deviated position link information in the first table 650. Further, the deviation information input section 610 transmits the deviated position link information to the adjacent link detecting and judging section 620, and enables the adjacent link detecting and judging section 620 to detect links adjacent to the deviated position link.

The adjacent link detecting and judging section 620 detects link information detected from map data in a process of calculating an optimum path from the deviated position to the original path. That is, the adjacent link detecting and judging section 620 detects links from map data, which are adjacent to reserved links, which will be included in the deviated position link, or the optimum link. In this case, if there is an adjacent link meeting the original path from among the detected adjacent links, the adjacent link detecting and judging section 620 stores the corresponding adjacent link in the first table. On the contrary, if there is no link meeting the original path from among the detected adjacent links, the adjacent link detecting and judging section 620 stores the adjacent link information in the second table 630. Further, the adjacent link detecting and judging section 620 judges if there exist a link meeting the original path from among the detected adjacent links, or if the link of the original path meeting the detected links is a destination link. From the result of the judgment, the adjacent link detecting and judging section 620 controls an operation of the path selecting section 640 and the re-routing information extraction section 660. For example, when the destination link is included in the detected adjacent links, the re-routing information extraction section 660 performs an inverse trace for the destination links on the basis of the link information stored in the first table 650, and enables the re-routing paths to be determined. When there is no link meeting the original path from among the detected adjacent links, the adjacent link detecting and judging section 620 stores the detected adjacent links in the second table 630 and then enables the path selecting section 640 to select a link having a minimum cost from the second table, and to move the selected link to the first table.

The second table 630 temporarily stores link information detected by the adjacent link detecting and judging section 620. In the present example, the link information stored in the second table 630 includes an accumulated travel cost information from the deviated position to the corresponding link according to each link.

According to the control of the adjacent link detecting and judging section 620, the path selecting section 640 analyzes the link information stored in the second table 630, and selects an optimum path from the deviated position link to one link from among links included in the original path. In the present example, the path selecting section 640 selects an optimum path, for instance, an optimum path to predetermined destination provided from the information server according to a user request, from the deviated position to the original path by means of a path calculation algorithm generally utilized in a navigation system. The path selecting section 640 selects an optimum path from the deviated position link to any one link from among the plurality of links. In order to calculate the optimum path, the path selecting section 640 selects a link from among links stored in the second table 630, which has a minimum travel cost, and then stores the selected link in the first table 650. Further, the path selecting section 640 enables the adjacent link detecting and judging section 620 to detect links adjacent to the selected link.

The first table 650 stores link information selected as reserved links, which will be included in the optimum path, from the second table 630 in a process that the path selecting section 640 calculates the optimum path.

According to the control of the adjacent link detecting and judging section 620, the re-routing information extraction section 660 extracts links included in the optimum path from the deviated position to the original path, from among links stored in the first table 650, and then extracts re-routing paths including the extracted links. That is, the re-routing information extraction section 660 extracts the re-routing paths, which enables the movable body to arrive at a destination of the original path from the deviated position via the optimum path. It is preferred that the re-routing apparatus 600 is embedded in the navigation terminal 200 (FIG. 4).

Figure 6:
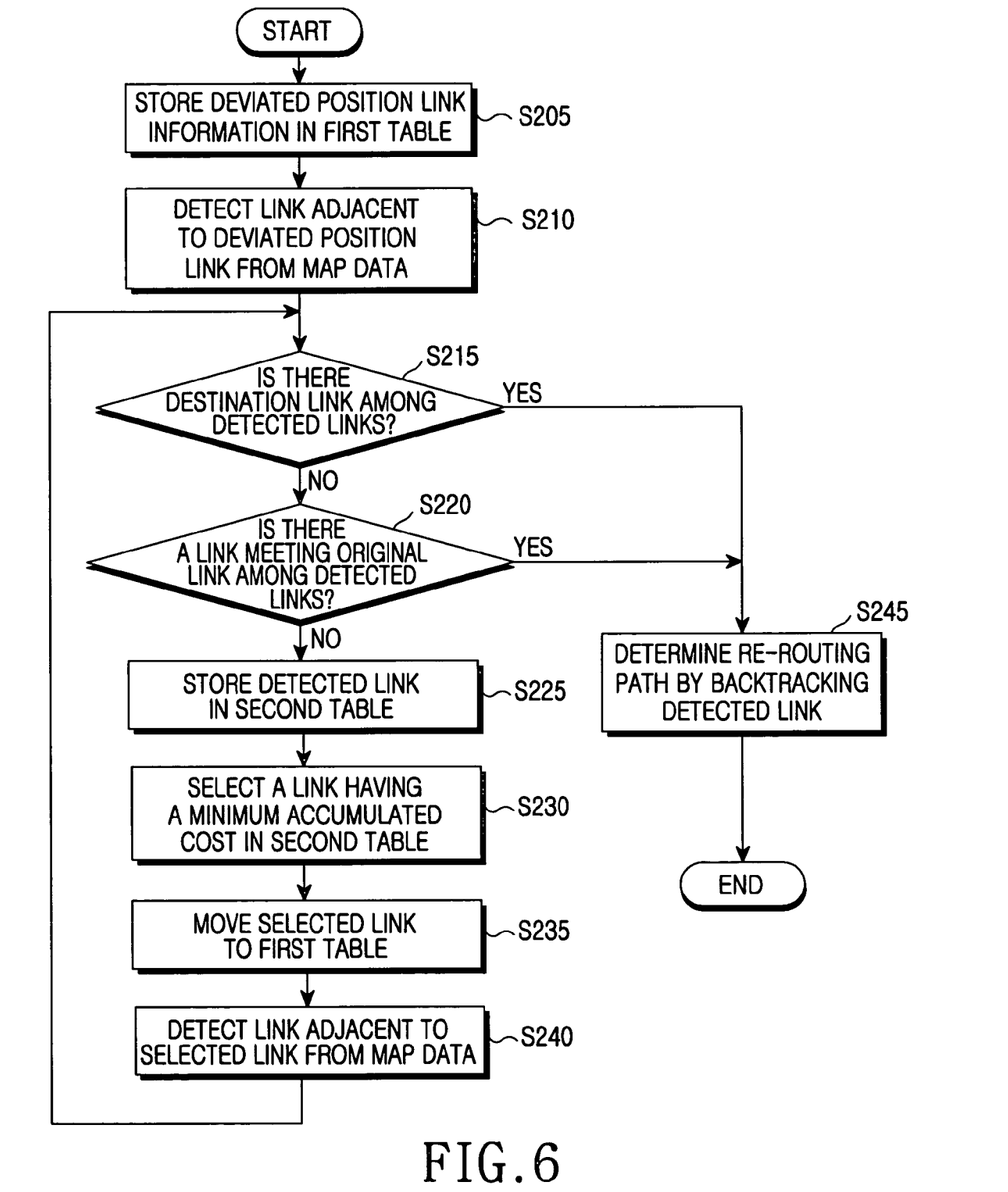
FIG. 6 is a flow chart of a re-routing method according to a first embodiment of the present invention.
Figure 7:
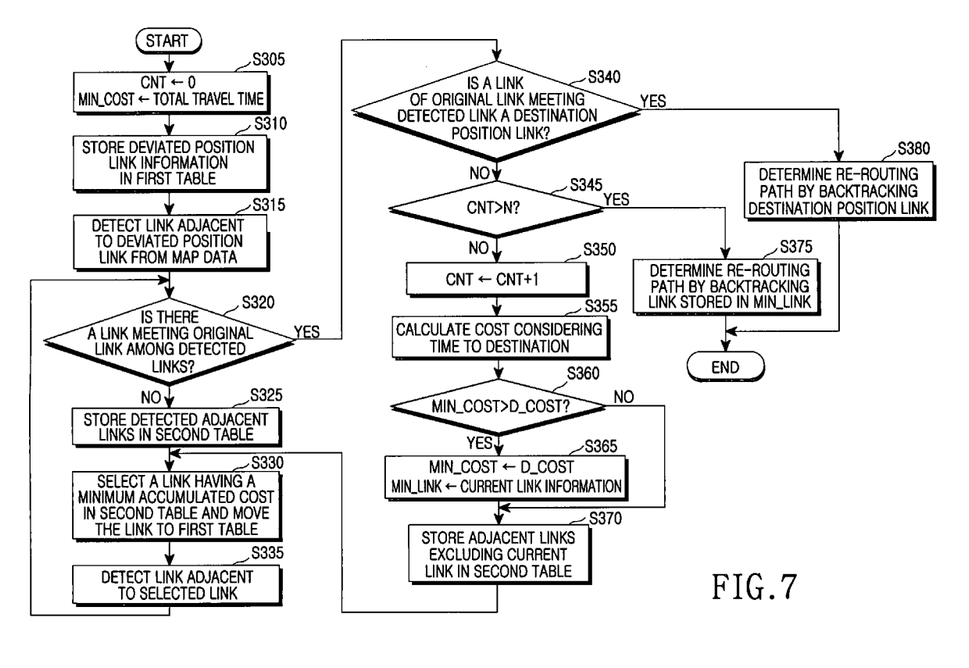
FIG. 7 is a flow chart of a re-routing method according to a second embodiment of the present invention.

FIGS. 6 and 7 are flowcharts illustrating re-routing methods according to a first and a second embodiment of the present invention respectively. That is, FIG. 6 is a flowchart of a re-routing method according to the first embodiment of the present invention, in which a first one of links meeting a link extending in a direction having a small accumulated travel cost from a deviated position or a selected link is selected from among links included in the original path, and then a path from the deviated position through the selected link to the destination is determined as the re-routing path. FIG. 7 is a flowchart of a re-routing method according to the second embodiment of the present invention, in which information about a predetermined number of links meeting the link extending in a direction having a small accumulated travel cost from a deviated position or a selected link is compared with each other, so as to select a link having a minimum sum of a first cost necessary for traveling from the deviated position to corresponding link and a second cost necessary for traveling from the link to destination, and then a path from the deviated position through the selected link to the destination is determined as the re-routing path.

Referring to FIGS. 5 and 6, the re-routing method according to the first embodiment of the present invention is described. When the movable body, which has traveling according to a predetermined path guidance transmitted from the navigation terminal 200, has deviated from the path, a predetermined apparatus such as a deviation sensing section, which was installed on the navigation terminal 200, senses the path deviation of the movable body and then transmits the path deviation information such as the deviated position link information to the re-routing apparatus 600.

Next, the deviation information input section 610 stores the deviated position link information in the first table 650 in step S205 and transmits the deviated position link information to the adjacent link detecting and judging section 620. The adjacent link detecting and judging section 620 detects links adjacent to the deviated position link from the map data by means of the deviated position link information in step S210 and checks, in sequence, if there exist the destination link from among the detected links, or if there exist links meeting the original path from among the detected links in steps S215 and S220 respectively. From the result obtained by checking steps S215 and S220, when the destination link has not been included in the detected links and there are no links meeting the original path from among the detected links, the adjacent link detecting and judging section 620 stores the detected links in the second table 630 in step S225. In this case, the link information stored in the second table 630 includes accumulated travel cost information from the deviated position to corresponding link according to each link.

The path selecting section 640 selects a link from among the links stored in the second table 630, which has a minimum accumulated cost, and then enables the selected links to be moved from the second table 630 to the first table 650 in step S235. Further, the path selecting section 640 controls the adjacent link detecting and judging section 620 to detect links adjacent to the selected links. The adjacent link detecting and judging section 620 detects links adjacent to the selected links in step S240, and then loops to perform step S215 and step S220.

From the result obtained by checking in step S215, when the destination link has not been included in the links detected in step S210 or there exist links meeting the original path from among the detected links, the destination link from among the detected adjacent links or the link meeting the original path are backtracked. From the result of backtracking, the optimum path from the deviated position to the original path is extracted and the re-routing paths, which include links included in the optimum path, are extracted in step S245. That is, in step S245, the optimum path is extracted by backtracking the links prior to the selected links, and the re-routing paths are extracted, which enable the movable body to arrive at the destination of the original path from the deviated position via the optimum path.

Referring now to FIGS. 5 and 7, the re-routing method according to the second embodiment of the present invention is described below. As described above, according to the re-routing method of the second embodiment of the present invention, information about a predetermined number of links meeting the link extending in a direction having a small accumulated travel cost from the deviated position is compared with each other, so as to select a link having a minimum sum (hereinafter, referred to a third cost SUM_COST) of a first cost necessary for traveling from the deviated position to corresponding link and a second cost necessary for traveling from the link to destination, and then a path from the deviated position through the selected link to the destination is determined as the re-routing path. The second embodiment of the present invention includes a first variable CNT and a second variable MIN_COST, and initializes the first variable CNT and the second variable MIN_COST in step S305, wherein a first variable counts the number of times, by which the deviated position link and the original path meet each other, and the second variable MIN_COST compares the third costs SUM_COST necessary for traveling from the deviated position to the destination via links meeting the deviated link from among links included in the original path.

In this case, it is preferred that the second variable MIN_COST is a larger value than the third cost SUM_COST which may actually occur. This is for the original third cost SUM_COST to be updated into the second variable MIN_COST. In the example of FIG. 7, the second variable MIN_COST was set to slightly larger value than a total cost necessary for traveling from a first starting point to the destination. However, when the third cost SUM_COST necessary for traveling from the deviated position to the destination via the links meeting the deviated position link is actually very larger than a value set as an initial value of the second variable MIN_COST in step S305, the time information is discarded.

Accordingly, in order to exclude a case in which a time necessary for traveling from the deviated position to the destination exceeds a predetermined time when the re-routing has been performed, the second variable MIN_COST is set to a predetermined time value. For example, as the example of FIG. 7, in a case in which the second variable MIN_COST is set to a total time necessary for traveling from the first starting point to the destination, when the time necessary for traveling from the deviated position to the destination exceeds the total time necessary for traveling from the first starting point to the destination when the re-routing is performed, the re-routing information becomes useless. Here, the navigation system can provides the user with a message, which guides the user to reconnect to the server and find an optimum path from a current position to the destination, together with a re-routing error message. In the present example, when the movable body returns to the first starting point and comes into contact with the original path after having deviated from a path early, since the second variable MIN_COST may be larger than the original third cost SUM_COST, the initial value of the second variable MIN_COST may be set to a slightly larger value than the original third cost SUM_COST.

When the variables, i.e. the first variable CNT, the second variable MIN_COST, for the second embodiment of the present invention have been initialized, the deviation information input section 610 waits for receiving the path deviation information, for instance, the deviated position link information, etc., of the movable body outputted from the predetermined apparatus such as the deviation sensing section, which was installed on the navigation terminal 200.

Further, when the movable body, which has traveling according to a predetermined path guidance transmitted from the navigation terminal 200, has deviated from the path, and the predetermined apparatus, such as the deviation sensing section, transmits the path deviation information of the movable body such as the deviated position link information, the deviation information input section 610 stores the deviated position link information in the first table 630 in step S310, and then transmits the deviated position link information to the adjacent link detecting and judging section 620.

The adjacent link detecting and judging section 620 detects links adjacent to the deviated position link from the map data by means of the deviated position link information in step S315, and then judges if there exist links meeting the original path from among the detected adjacent links in step S320.

From the result of the judgment in step S320, when there is no link meeting the original path from among the detected adjacent links, the adjacent link detecting and judging section 620 stores the detected adjacent links in the second table 630 in step S325. In this case, the link information stored in the second table 630 includes accumulated cost information from the deviated position to corresponding link according to each link.

Further, according to the adjacent link detecting and judging section 620, the path selecting section 640 selects a link from among the adjacent links stored in the second table 630, which has a minimum cost, and then enables the selected links to be moved to the first table 650 in step S330. Further, the adjacent link detecting and judging section 620 detects links adjacent to the selected links in step S335, and then performs step S320.

From the result of the judgment in step S320, when there exist a link meeting the original path from among the detected adjacent links, the adjacent link detecting and judging section 620 judges again if the link of the original path meeting the detected links is a destination link in step S340.

From the result of the judgment in step S340, when the link of the original path meeting the detected links is the destination link, the adjacent link detecting and judging section 620 enables the re-routing information extraction section 660 to perform the inverse trace for the destination links and to determine the re-routing paths.

Next, the re-routing information extraction section 660 determines the re-routing paths by performing the inverse trace for the destination links on the basis of the link information stored in the first table 650 in step S380. That is, in step S380, an optimum path is extracted by backtracking the link prior to the destination link, and the re-routing paths are extracted, which enable the movable body to arrive at the destination of the original path from the deviated position via the optimum path.

From the result of the judgment in step S340, when the link of the original path meeting the detected links is not the destination link, the adjacent link detecting and judging section 620 compares the first variable CNT with a predetermined value N set in advance, so as to check the number of times, by which the adjacent link and the original path meet each other in step S345.

As a result of the comparison in step S345, when the first variable CNT is not larger than the predetermined value N set in advance, the value of the first variable CNT is increased by '1' in step S350, and then a fourth cost D_COST is calculated in step S355, which is an cost considering an cost necessary for traveling to the destination, that is, an cost considering the sum of the cost obtained by adding the first cost necessary for traveling from the deviated position to the corresponding link and the second cost necessary for traveling from the link to destination.

Further, the calculated fourth cost D_COST is compared with the second variable MIN_COST in step S360. Herein, when the second variable MIN_COST is larger than the fourth cost D_COST, the second variable MIN_COST is updated by means of the fourth cost D_COST, and corresponding link information is stored in the third variable MIN_LINK in step S365. This is for a link, which has a minimum fourth cost D_COST considering the cost to the destination, to be selected by comparing predetermined number N of link information meeting the deviated position link from among links included in the original path. From the result of the comparison in step S360, when the second variable MIN_COST is not larger than the fourth cost D_COST, step S365 is omitted. And, an adjacent links, which exclude current link, for instance, a link of the original path meeting the detected adjacent links, is stored in the second table 630 in step S370, and then step S330 and the consequent steps are repeated.

From the result of the comparison in step S345, when the first variable CNT is larger than the predetermined value N set in advance, since the number of meeting the original path is larger than the predetermined value N set in advance, re-routing paths are determined by backtracking the links stored in the third variable MIN_LINK (S375). That is, in step S375, the optimum path is extracted by backtracking links prior to links stored in the third variable MIN_LINK, and the re-routing paths are extracted, which enable the movable body to arrive at the destination of the original path from the deviated position via the optimum path.

Figure 8A:
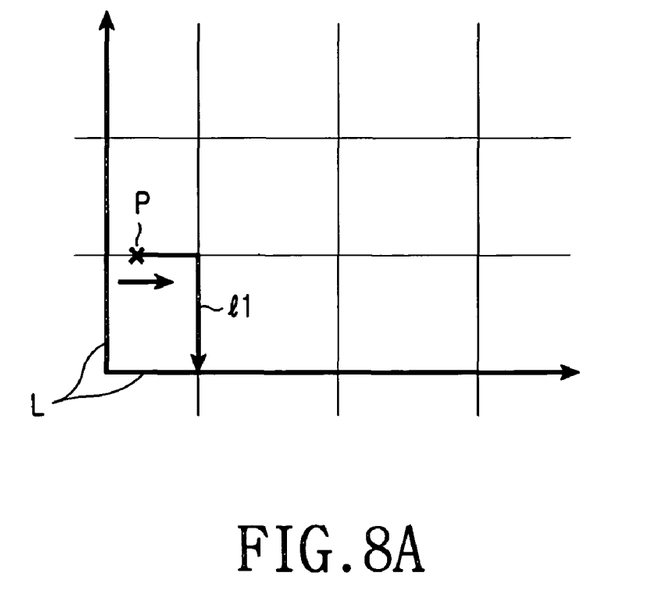
FIG. 8a and FIG. 8b are two dimensional space graphs showing a result from the re-routing according to the first and the second embodiment of the present invention.
Figure 8B:
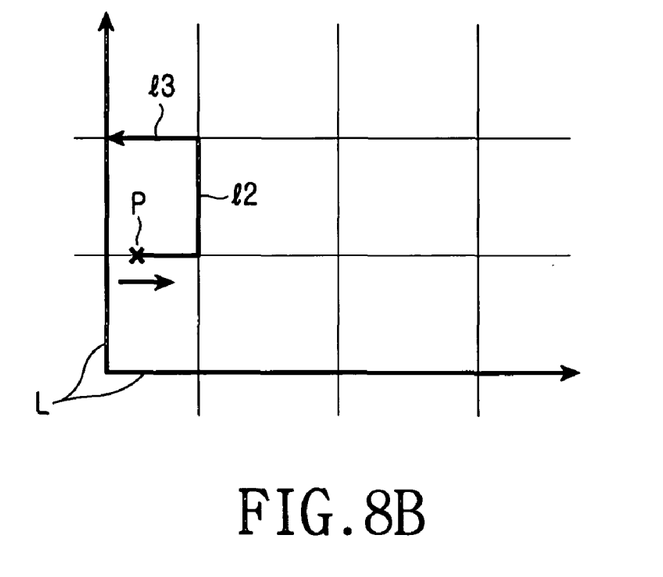

FIGS. 8a and 8b are directional graphs showing a result from the re-routing according to the first and the second embodiment of the present invention. The reference character 'P' represents a position of the deviated position of the movable body, an arrow under 'P' represents a moving direction of the movable body, and a big arrow L marked by a thick line represents the original path, wherein the direction of the arrow represents the direction of the destination. Thick arrows connected from the position of the deviated position of the movable body to the original path L represent re-routing paths (l1, l2, l3) according to the first and the second embodiment.

As described above, in a re-routing apparatus according to the present invention, when the movable body traveling on a predetermined path provided by the navigation system has deviated from the path, a navigation terminal by itself can calculate an optimum path from a deviated position to the original path without connecting with a server, thereby reducing communication cost for connection to the server and decreasing possibility of another deviation due to time delay taken until new paths are provided.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A re-routing apparatus in a navigation system, the apparatus comprising:
   a deviation information input section for receiving deviated position link information when a movable body traveling on a predetermined original path provided from the navigation system has deviated from the original path;
   an adjacent link detecting and judging section for receiving link information and detecting link information of links adjacent to links corresponding to the received link information from map data and determining a relation between detected links and the original path in a process of calculating an optimum path from a deviated position to the original path, when the movable body has deviated from the original path;
   a second table for temporarily storing said detected link information on the basis of a determination of the adjacent link detecting and judging section;
   a path selecting section for analyzing said link information stored in the second table and selecting reserved links to be included in the optimum path from the deviated position link to any one link from among links included in the original path, on the basis of the judgment result of the adjacent link detecting and judging section;
   a first table for storing the link information of the reserved links selected by the path selecting section; and
   a re-routing information extracting section for extracting re-routing paths from said reserved links stored in the first table on the basis of the determination of the adjacent link detecting and judging section.

2. The re-routing apparatus as claimed in claim 1, wherein the deviation information input section transmits the deviated position link information to the adjacent link detecting and judging section and enables the adjacent link detecting and judging section to detect links adjacent to the deviated position link.

3. The re-routing apparatus as claimed in claim 1, wherein the second table stores link information including accumulated cost information from the deviated position to a corresponding link according to each link detected by the adjacent link detecting and judging section.

4. The re-routing apparatus as claimed in claim 3, wherein the path selecting section selects a link from among links stored in the second table as a reserved link which has a minimum accumulated cost, stores the selected link in the first table, transmits the reserved link information to the adjacent link detecting and judging section, and enables the adjacent link detecting and judging section to detect links adjacent to the reserved links.

5. The re-routing apparatus as claimed in claim 1, wherein the adjacent link detecting and judging section detects the deviated position link transmitted from the deviation information input section and the links adjacent to the reserved links selected by the path selecting section.

6. The re-routing apparatus as claimed in claim 5, wherein the adjacent link detecting and judging section determines if there exist links meeting the original path from among the detected adjacent links or if there exist destination links from among the detected adjacent links and controls an operation of the second table, the path selecting section and the re-routing information extraction section on the basis of the judgment result.

7. The re-routing apparatus as claimed in claim 6, wherein, as a result of the determination, when there are no links meeting the original path from among the detected adjacent links and there are no destination links from among the detected adjacent links, the adjacent link detecting and judging section stores the detected adjacent links in the second table.

8. The re-routing apparatus as claimed in claim 6, wherein as a result of the determination, when there are destination links from among the detected adjacent links, the adjacent link detecting and judging section enables the re-routing information extraction section to determine the re-routing paths by backtracking the destination link on the basis of the link information stored in the first table.

9. The re-routing apparatus as claimed in claim 6, wherein, as a result of the determination, when the detected adjacent links include at least one link, which is not a destination link but meets the original path, the adjacent link detecting and judging section enables the re-routing information extraction section to determine the re-routing paths by backtracking links meeting the original path, on the basis of the link information stored in the first table.

10. The re-routing apparatus as claimed in claim 6, wherein, as a result of the determination, when the detected adjacent links include at least one link, which is not a destination link but meets the original path, the adjacent link detecting and judging section enables the path selecting section to select a link having a minimum cost from among predetermined number of link information meeting the original path, which is a cost necessary for traveling from the deviated position to the destination via corresponding link, and enables the re-routing information extraction section to determine the re-routing paths by backtracking the links selected by the path selecting section, on the basis of the link information stored in the first table.

11. A re-routing method in a navigation system, the method comprising the steps of:
   (1) when a movable body traveling on a predetermined original path provided from the navigation system has deviated from the path, extracting a deviated position link information from map data; and
   (2) selecting links meeting links extending in a direction having small accumulated travel cost from the deviated position link from among links included in the original path and determining which paths are re-routing paths, wherein the re-routing paths are paths extending from a deviated position to the destination via the selected links.

12. The re-routing method as claimed in claim 11, wherein in step 2 a first one of links meeting a link extending in a direction having a small accumulated travel cost from the deviated position is determined as the re-routing path.

13. A re-routing method of a navigation system, the method comprising the steps of:
   (1) when a movable body traveling on a predetermined original path provided from the navigation system has deviated from the path, extracting a deviated position link information from map data; and
   (2) selecting links meeting links extending in a direction having small accumulated travel cost from the deviated position link from among links included in the original path and determining which paths are re-routing paths, wherein the re-routing paths are paths extending from a deviated position to the destination via the selected links, wherein a first one of links meeting a link extending in a direction having a small accumulated travel cost from the deviated position is determined as the re-routing path,
   wherein step 2 further comprises:
   (2-1) detecting link information adjacent to the deviated position link from map data;
   (2-2) checking in sequence if there exists a destination link among the detected links or if there exists a link meeting the original path from among the detected links;
   (2-3) as a result of checking in step 2-2, when there exists the destination link or the link meeting the original path among the detected links, determining which paths are re-routing paths to the destination via the link;
   (2-4) as a result of checking in step 2-2, when there is no destination link or the link meeting the original path from among the detected links, storing the detected link information temporarily; and
   (2-5) selecting a link with a minimum accumulated travel cost necessary for traveling from the deviated position link to the corresponding link from among the temporarily stored link information; and
   repeating steps 2-1 to 2-5 after detecting link information adjacent to the selected link.

14. A re-routing method in a navigation system, the method comprising the steps of:
   (1) when a movable body traveling on a predetermined original path provided from the navigation system has deviated from the path, extracting a deviated position link information from map data; and
   (2) selecting links meeting links extending in a direction having small accumulated travel cost from the deviated position link from among links included in the original path and determining which paths are re-routing paths, wherein the re-routing paths are paths extending from a deviated position to the destination via the selected links, wherein, information about a predetermined number of links meeting the link extending in the direction having a small accumulated travel cost from the deviated position link is compared with each other, so as to select a link having a minimum sum of a first cost necessary for traveling from the deviated position to a corresponding link and a second cost necessary for traveling from the link to destination, and then a path from the deviated position through the selected link to the destination is determined as the re-routing path.

15. The re-routing method as claimed in claim 14, wherein step 2 further comprises the steps of:
   (2-6) detecting link information adjacent to the deviated position link from said map data;
   (2-7) checking if there exists a link meeting the original path among the detected links;
   (2-8) as a result of checking in step 2-7, when there is no link meeting the original path from among the detected links, storing the link information temporarily, selecting a link has a minimum accumulated cost from among the stored link information, and repeating steps 2-6 to 2-8 after detecting links adjacent to the selected link;
   (2-9) as a result of checking in step 2-7, when there exists the link meeting the original path from among the detected links, checking if a link of the original path, meeting the detected links is a destination link; and
   (2-10) as a result of checking in step 2-9 when the link of the original path, meeting the detected links is the destination link, determining re-routing paths by backtracking the destination link.

16. The re-routing method as claimed in claim 15, wherein step 2 further comprises the steps of:
   (2-11) as a result of checking in step 2-9 when the link of the original path meeting the detected links is not the destination link, storing the link information of the original path meeting the detected links, while counting the number of times by which the detected links and the original path meet each other;
   (2-12) when the number of times, by which the detected links and the original path meet each other, is larger than a predetermined number set in advance in step (2-11), selecting a link has minimum cost necessary for traveling from the deviated position to the destination via corresponding link from among the already stored link information; and
   (2-13) determining the re-routing paths by backtracking the link selected in step (2-12).

17. The re-routing method as claimed in claim 16, wherein, in step 2-11 only a link, which has minimum cost necessary for traveling to the destination via the link of the original path meeting the detected links, is stored until the number of times, by which the detected links and the original path meet each other, exceeds the predetermined number set in advance.

18. The re-routing method as claimed in claim 15, wherein step 2 further comprises the step of (2-14) determining a re-routing error, when the cost exceeds a predetermined cost set in advance, which is a cost necessary for traveling from the deviation from the original path to the destination via the link having minimum cost selected in step 2-12.

19. A navigation system comprising:
a re-routing apparatus comprising:
a first table for storing link information of reserved links selected by a path selecting section;
a second table for temporarily storing detected link information on the basis of a determination of an adjacent link detecting and judging section;
the path selecting unit coupled to both of the first and second tables,
wherein, the re-routing apparatus calculates an optimum path from a path deviated position to an original path received from an information server via a mobile terminal, when a movable body traveling on a predetermined original path provided from the navigation system has deviated from the original path.

20. The navigation system as claimed in claim 19, wherein the re-routing apparatus further comprises:
a deviation information input section for receiving deviated position link information, when the movable body has deviated from the original path;
the adjacent link detecting and judging section for receiving link information and detecting link information of links adjacent to links corresponding to the received link information from map data, and determining a relation between the detected links and the original path in a process of calculating an optimum path from the deviated position to the original path, when the movable body has deviated from the original path;
the path selecting section for analyzing the link information stored in the second table and selecting reserved links to be included in an optimum path from the deviated position link to any one link from among links included in the original path, on the basis of the determination of the adjacent link detecting and judging section; and
a re-routing information extracting section for extracting re-routing paths from the links stored in the first table, on the basis of the determination of the adjacent link detecting and judging section.

21. The navigation system as claimed in claim 20, wherein the deviation information input section transmits the deviated position link information to the adjacent link detecting and judging section, and enables the adjacent link detecting and judging section to detect links adjacent to the deviated position link.

22. The navigation system as claimed in claim 20, wherein the second table stores link information including accumulated cost information from the deviated position to a corresponding link according to each link detected by the adjacent link detecting and judging section.

23. The navigation system as claimed in claim 22, wherein the path selecting section selects a link from among the links stored in the second table as reserved link, which has a minimum accumulated cost, and stores the selected link in the first table, and transmits the reserved link information to the adjacent link detecting and judging section and enables the adjacent link detecting and judging section to detect links adjacent to the reserved links.

24. The navigation system as claimed in claim 20, wherein the adjacent link detecting and judging section detects the deviated position link transmitted from the deviation information input section and the links adjacent to the reserved links selected by the path selecting section.

25. The navigation system as claimed in claim 24, wherein the adjacent link detecting and judging section determines if there exists links meeting the original path from among the detected adjacent links, or if there exists destination links from among the detected adjacent links, and controls an operation of the second table, the path selecting section and the re-routing information extraction section on the basis of the determination.

26. The navigation system as claimed in claim 25, wherein as a result of the determination, when there are no links meeting the original path from among the detected adjacent links and there are no destination links from among the detected adjacent links, the adjacent link detecting and judging section stores the detected adjacent links in the second table.

27. The navigation system as claimed in claim 25, wherein as a result of the determination, when there are destination links from among the detected adjacent links, the adjacent link detecting and judging section enables the re-routing information extraction section to determine the re-routing paths by backtracking the destination link, on the basis of the link information stored in the first table.

28. The navigation system as claimed in claim 25, wherein as a result of the determination, when the detected adjacent links include at least one link, which is not a destination link but meets the original path, the adjacent link detecting and judging section enables the re-routing information extraction section to determine the re-routing paths by backtracking links meeting the original path, on the basis of the link information stored in the first table.

29. The navigation system as claimed in claim 25, wherein as a result of the determination, when the detected adjacent links include at least one link, which is not a destination link but meets the original path, the adjacent link detecting and judging section enables the path selecting section to select a link having a minimum cost from among predetermined number of link information meeting the original path, which is an cost necessary for traveling from the deviated position to the destination via corresponding link, and enables the re-routing information extraction section to determine the re-routing paths by backtracking the links selected by the path selecting section, on the basis of the link information stored in the first table.

* * * * *